US011378227B2

(12) United States Patent
Qu (10) Patent No.: US 11,378,227 B2
(45) Date of Patent: Jul. 5, 2022

(54) DISPLAY SCREEN SUPPORT HOLDER (71) Applicant: STRONKIN ELECTRONICS CO., LTD, Jiangsu (CN)

(72) Inventor: Bo Qu, Jiangsu (CN)

(73) Assignee: STRONKIN ELECTRONICS CO., LTD, Jiangsu (CN)

(*) Notice: Subject to any disclaimer, the term of this patent is extended or adjusted under 35 U.S.C. 154(b) by 159 days.

(21) Appl. No.: 16/757,091

(22) PCT Filed: Oct. 30, 2019

(86) PCT No.: PCT/CN2019/114416
§ 371 (c)(1),
(2) Date: Apr. 17, 2020

(87) PCT Pub. No.: WO2020/258627
PCT Pub. Date: Dec. 30, 2020

(65) Prior Publication Data
US 2021/0404596 A1 Dec. 30, 2021

(30) Foreign Application Priority Data
Jun. 23, 2019 (CN) .......................... 201910545862.5

(51) Int. Cl.
F16M 11/10 (2006.01)

(52) U.S. Cl.
CPC ..... F16M 11/105 (2013.01); F16M 2200/041 (2013.01)

(58) Field of Classification Search
CPC ........... F16M 11/105; F16M 2200/041; F16M 11/18; F16M 11/06; F16M 11/046; F16M 11/20; F16F 15/28
See application file for complete search history.

(56) References Cited

U.S. PATENT DOCUMENTS

| 9,316,346 B2* | 4/2016 | Lau ...................... F16M 13/022 |
| 2010/0006716 A1* | 1/2010 | Yen .................... F16M 11/2021 248/125.1 |

(Continued)

FOREIGN PATENT DOCUMENTS

| CN | 103363270 A | 10/2013 |
| CN | 205579064 | * 9/2016 |

(Continued)

OTHER PUBLICATIONS

International Preliminary Report on Patentability (Chapter 1 of the Patent Cooperation Treaty) dated Mar. 25, 2020, pertaining to PCT Application No. PCT/CN2019/114416.

Primary Examiner — Terrell L McKinnon
Assistant Examiner — Ding Y Tan
(74) Attorney, Agent, or Firm — Dinsmore & Shohl LLP (57) ABSTRACT A display screen support holder is provided, including a stand, a screen connecting base, and a constant force spring; wherein the screen connecting base is pivotally connected with the stand and configured to be connected with a display; after a display screen is mounted to the screen connecting base, a gravity center of combined gravity of the display screen and the screen connecting base is set to be deviated from a screen rotation center of the screen connecting base; two ends of the constant force spring include a moving end and a swinging end, the moving end is movably arranged on the stand, and the swinging end is swingably and pivotally connected with the screen connecting base. In the process of swinging of the display screen, the spring torque generated by the constant force spring and the screen torque are always kept equal in magnitude and opposite in direction.

13 Claims, 5 Drawing Sheets (56) References Cited

U.S. PATENT DOCUMENTS

| | | | | |
|---|---|---|---|---|
| 2013/0161466 A1* | 6/2013 | Lau | ...................... | F16M 13/022 |
| | | | | 248/288.11 |
| 2015/0102200 A1* | 4/2015 | Aoyagi | ................ | F16D 63/008 |
| | | | | 248/610 |
| 2019/0069422 A1* | 2/2019 | Choi | ...................... | F16M 11/42 |

FOREIGN PATENT DOCUMENTS

| | | | | | |
|---|---|---|---|---|---|
| CN | 108799736 | A | * | 11/2018 | ........... F16M 11/046 |
| CN | 108799736 | A | | 11/2018 | |
| CN | 109236945 | A | * | 1/2019 | |
| CN | 109236945 | A | | 1/2019 | |
| CN | 110375169 | A | | 10/2019 | |
| JP | 09303681 | A | | 11/1997 | |
| TW | M448598 | U1 | | 3/2013 | |
| TW | M467080 | U | | 7/2015 | |
| WO | WO-2007055750 | A2 | * | 5/2007 | ........... G06F 1/1616 |

\* cited by examiner

DISPLAY SCREEN SUPPORT HOLDER

CROSS-REFERENCE TO RELATED APPLICATIONS

The present disclosure is a National Phase Entry of International Application No. PCT/CN2019/114416, entitled DISPLAY SCREEN SUPPORT HOLDER and filed on Oct. 30, 2019, which claims priority to Chinese Patent Application No. 201910545862.5, filed with the Chinese Patent Office on Jun. 23, 2019, entitled Display Screen Support holder, the contents of both are incorporated herein by reference in their respective entireties.

TECHNICAL FIELD

The present disclosure relates to the technical field of display screen supporting, and in particular to a display screen support holder.

BACKGROUND ART

In a projection plane perpendicular to a rotation axis of a screen connecting base (i.e., in a projection plane parallel to the screen connecting base), the gravity center of a display screen mounted to an existing rotary display screen support holder is usually set outside the rotation center of the screen connecting base. The screen connecting base is swingably arranged on a stand, and a coil spring configured to balance the gravity of the display screen is arranged between the screen connecting base and the stand, the existing rotary display screen support holder has the problem that a torque (or moment) generated by the coil spring changes at any time with the swinging of the screen connecting base due to the linear force-varying characteristic of the coil spring, the torque formed by the coil spring fluctuates within a certain range around a value with which the gravitational torque is balanced, an error between the two torques cannot be eliminated, and thus the gravitational torque cannot be completely balanced. A user may have an unpleasant handfeel when swinging the display screen with his/her hand.

In addition, multiple gears or even non-circular gears and cams are used in some prior-art technologies, in which complex structures and many parts are involved, thus a high precision is required, high processing complexity is caused, and low rigidity is caused. In the prior art, the screen connecting base can swing only within a range of 90° and cannot be swung by 180° or more due to structural limitations, which is very inconvenient in use.

SUMMARY

An object of the present disclosure is to provide a display screen support holder to solve at least one of the above-mentioned technical problems in the prior art.

In order to solve the above-mentioned technical problems, the present disclosure provides a display screen support holder, comprising: a stand, a screen connecting base, and a constant force spring;

wherein the screen connecting base is pivotally connected with the stand in such a manner as to be rotatable about a screen rotation center and is configured to be connected with a display;

after the display screen is mounted to the screen connecting base, an overall gravity center of combined gravity of the display screen and the screen connecting base (i.e., a gravity center of the screen connecting base and the display screen as a whole) is set to be deviated from the screen rotation center (i.e., a center of pivoting of the screen connecting base) in a projection plane perpendicular to a rotation axis of the screen connecting base;

two ends of the constant force spring comprise a moving end and a swinging end, wherein the moving end is movably arranged on the stand, and the swinging end is pivotably connected with the screen connecting base in such a manner as to be swingable about a center of swinging; and during swinging of the screen connecting base, a screen torque which the combined gravity generates with respect to the screen rotation center changes constantly with the swinging of the screen connecting base; the moving end of the constant force spring is moved along with the swinging of the screen connecting base, the constant force spring is stretched or contracted with the movement of the moving end, and a spring torque which a spring force of the constant force spring generates with respect to the screen rotation center also changes along with the stretching and contracting and is the constant force spring is configured to dynamically balance the screen torque.

The present disclosure involves a simple structure. In the process of swinging of the display screen, the spring torque generated by the constant force spring and the screen torque are always kept equal in magnitude and opposite in direction, and changes of the spring torque and the screen torque without zero error are indeed achieved during the entire process, so that a larger screen can be swung more flexibly and effortlessly, the screen can be rotated by being pushed slightly, and the display screen can be stopped at any time during swinging, whereby the user experience is greatly improved.

Optionally, the center of swinging of the swinging end on the screen connecting base (or referred to as a center of pivoting of the spring), the overall gravity center, and the screen rotation center are located on the same straight line.

Optionally, in a projection plane perpendicular to the rotation axis of the screen connecting base, the gravity center of the screen connecting base coincides with the screen rotation center; the gravity center of the display screen is set to be deviated from the screen rotation center, and the screen torque is from the combined gravity of the screen connecting base and the display screen and acts on the screen rotation center.

Optionally, the display screen support holder further comprises a moving member movably arranged on the stand and a track arranged on the stand, wherein the moving end of the constant force spring is connected with the moving member, and the moving member is movably arranged on the track. That is to say, the moving end is movably (in a rollable or slidable manner) connected with the stand via the moving member.

Optionally, the display screen support holder further comprises a sliding rail, wherein the sliding rail comprises a movable rail which serves as the moving member and a fixed rail which serve as the track and roll balls; the moving end of the constant force spring is connected with the movable rail, and the fixed rail is fixedly arranged on the stand; roll balls are arranged between the movable rail and the fixed rail, and the movable rail is rollably and movably arranged on the fixed rail via the roll balls.

Optionally, the moving member is movably arranged on the track via a rolling bearing; or optionally, the moving member is a slider slidably arranged on the track.

The moving member is arranged on the track via the rolling bearing, whereby the frictional resistance applied to the moving member can be effectively reduced, so that the moving end of the constant force spring can slide quickly with the swinging of the screen connecting base, and a balance between the spring torque and the screen torque is quickly achieved (that is, combining sum of the spring torque and the screen torque is zero).

When the moving member is in the form of a slider, there is a friction damping force, thus the display screen can be more stabilized after being positioned and is less likely to be swung freely due to interference from an external force due to a cooperation between the spring force and the friction damping force, thereby avoiding hindering a viewer from watching the display screen.

Here, optionally, the track is in a linear shape and is horizontally arranged.

Of course, the track may also be in the form of an arc or a curve and configured to increase a resistance or a propelling force applied to the moving end of the constant force spring during sliding.

Optionally, the display screen support holder further comprises a swinging member, wherein the swinging member is pivotally connected with the screen connecting base in such a manner as to be rotatable about the center of swinging, and the swinging end of the constant force spring is connected with the swinging member and is rotatably connected with the screen connecting base via the swinging member.

Optionally, the swinging end of the constant force spring is arranged on a side closer to the overall gravity center, of the screen rotation center, and the moving end is arranged above the swinging end; or the swinging end of the constant force spring is arranged on a side away from the overall gravity center, of the screen rotation center, and the moving end is arranged below the swinging end.

Optionally, an even number of constant force springs are provided and are arranged in pairs, and the two constant force springs in each pair are arranged symmetrically.

Here, a central axis of a winding portion of each constant force spring is perpendicular to or parallel to the screen connecting base.

Optionally, two constant force springs are provided, and the two constant force springs are arranged symmetrically. That is to say, both ends of the two constant force springs are arranged on the same moving member and on the same swinging member in a back-to-back or face-to-face manner, respectively.

Optionally, the track comprises a first track and a second track, wherein the first track is arranged on the stand and above the screen rotation center, and the second track is arranged on the stand and below the screen rotation center;

the moving member comprises a first moving member arranged on the first track, and a second moving member arranged on the second track;

the swinging member comprises a first swinging member arranged on the left side of the screen rotation center of the screen connecting base, and a second swinging member arranged on the right side of the screen rotation center of the screen connecting base; and the constant force spring comprises a first spring arranged between the first moving member and the first swinging member, and a second spring arranged between the second moving member and the second swinging member.

That is to say, this technical solution involves two sets of moving members, swinging members, and tracks. More preferably, the two sets of moving members, swinging members, and tracks are centrosymmetrically arranged with the screen rotation center being a reference center, and the spring torque from the first spring and the spring torque from the second spring are set bilaterally symmetrically to each other, thus the structure is more stable.

Optionally, each of the moving end and the swinging end is a winding portion or a connector end of the constant force spring.

Optionally, a damper (e.g., a POM (Polyformaldehyde) friction member) is arranged between the screen connecting base and the stand, and the damper tends to prevent the screen connecting base from swinging relative to the stand.

Optionally, the screen connecting base is a circular disc body, and the stand is provided with an outer ring mounting structure (e.g., an annular groove, an annular mounting table, or the like) adapted to an outer diameter of the circular disc body; wherein, optionally, a rolling member (e.g., a roll ball, a bearing, a roller, or the like) is arranged between the circular disc body and the outer ring mounting structure, and the screen connecting base is rotatably arranged on the outer ring mounting structure via the rolling member.

Moreover, a limiting structure (e.g., a limiting boss and a positioning pin and a positioning hole engaged with each other) configured to restrict an angle of rotation of the screen connecting base is arranged between the screen connecting base and the stand. Optionally, one limiting structure is arranged at a 0° middle position and two limiting structures are respectively arranged at the left 90° position and the right 90° position.

With the technical solutions described above, the present disclosure has the following advantageous effects:

The display screen support holder according to the present disclosure has a simple structure. In the process of swinging of the display screen, the spring torque generated by the constant force spring and the screen torque are always kept equal in magnitude and opposite in direction, and changes of the spring torque and the screen torque with zero error are indeed achieved during the entire process, so that a larger screen can be swung more flexibly and effortlessly, the display screen can be rotated by being pushed slightly, and the display screen can be stopped at any time during the swinging, whereby the user experience is greatly improved.

In addition, in the present disclosure, the screen connecting base is allowed to swing by 90° in both directions, that is, to swing within a swingable range of at least 180° from the 9 o'clock direction to the 15 o'clock direction, and the display screen support holder has a simple structure and is suitable for mass production and widespread application.

BRIEF DESCRIPTION OF DRAWINGS

In order to more clearly illustrate technical solutions of specific embodiments of the present disclosure or of the prior art, drawings required for use in the description of the specific embodiments or the prior art will be described briefly below. It is apparent that the drawings in the following description are illustrative of some embodiments of the present disclosure. It will be understood by those of ordinary skill in the art that other drawings can also be obtained from these drawings without any inventive effort.

REFERENCE SIGNS

1—display; $O_1$—screen rotation center; $O_2$—overall gravity center; $O_3$—center of swinging; G—combined gravity; 10—stand; 11—track; 11a—first track; 11b—second track; 12—moving member; 12a—first moving member; 12b—second moving member; 20—screen connecting base; 21—swinging member; 21a—first swinging member; 21b—second swinging member; 30—constant force spring; 30a—left constant force spring; 30b—right constant force spring; 30c—first spring; 30d—second spring; 31—moving end; 32—swinging end.

DETAILED DESCRIPTION OF EMBODIMENTS

The technical solutions of the present disclosure will be described below clearly and completely with reference to the accompanying drawings. It is apparent that the embodiments to be described are some, but not all of the embodiments of the present disclosure. All the other embodiments obtained by those of ordinary skill in the art in light of the embodiments of the present disclosure without inventive efforts shall fall within the scope of the present disclosure as claimed.

In the description of the present disclosure, it should be noted that orientation or positional relations indicated by terms such as 「center」, 「up」, 「down」, 「left」, 「right」, 「vertical」, 「horizontal」, 「inside」, and 「outside」 are the orientation or positional relations shown based on the figures, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, the terms 「first」, 「second」, and 「third」 are used for descriptive purposes only, and should not be understood as an indication or implication of relative importance.

In the description of the present disclosure, it should be noted that the terms 「mounted」, 「coupled」, and 「connected」 should be understood in a broad sense unless otherwise expressly specified or defined. For example, a connection may be fixed connection or detachable connection or integral connection, may be mechanical connection or electrical connection, or may be direct coupling or indirect coupling via an intermediate medium or internal communication between two elements. The specific meanings of the above-mentioned terms in the present disclosure can be understood by those of ordinary skill in the art according to specific situations.

The present disclosure will be further explained and described below in connection with specific embodiments.

First Embodiment

Figure 1:
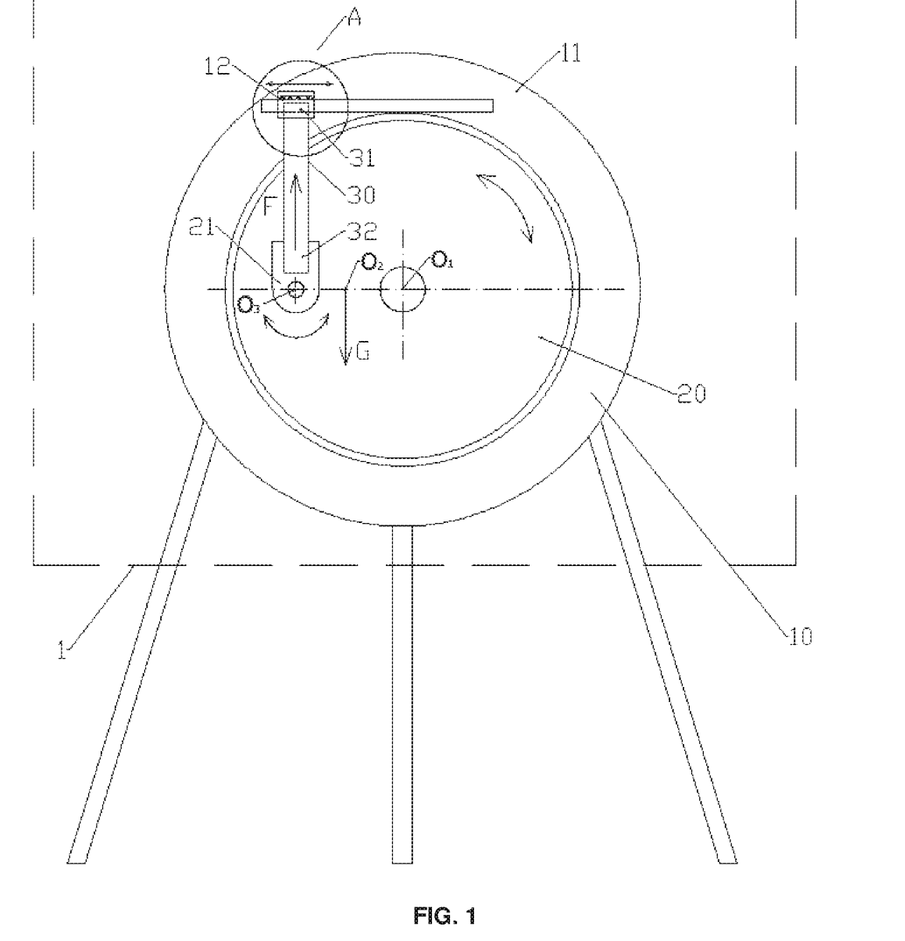
FIG. 1 is a schematic structural diagram of a display screen support holder according to a first embodiment of the present disclosure.

As shown in FIG. 1, this embodiment provides a display screen support holder, comprising a stand 10, a screen connecting base (or connecting seat) 20, and a constant force spring 30.

The screen connecting base 20 is rotatably and pivotally connected (or pivotally jointed) to the stand 10 and configured to be connected with a display screen 1; after the display screen 1 is mounted to the screen connecting base 20, an overall gravity center $O_2$ of the combined gravity G of the display screen 1 and the screen connecting base 20 (i.e., a gravity center of the screen connecting base 20 and the display screen 1 as a whole) is set to be deviated from a screen rotation center $O_1$ of the screen connecting base 20.

The two ends of the constant force spring 30 comprise a moving end 31 and a swinging end 32, wherein the moving end 31 is movably arranged on the stand 10, and the swinging end 32 is in a swingable pivot connection with the screen connecting base 20.

During swinging of the screen connecting base 20, a screen torque which the combined gravity G generates with respect to the screen rotation center $O_1$ changes constantly; the moving end of the constant force spring 30 slides with the swinging of the screen connecting base 20, the constant force spring 30 is stretched or contracted with the sliding of the moving end, and a spring torque which the spring force F generates with respect to the screen rotation center $O_1$ also changes synchronously and in proportion therewith and is configured to dynamically balance the screen torque. That is to say, the spring torque and the screen torque are always kept equal in magnitude and opposite in direction during the swinging, or the difference between the spring torque and the screen torque is always kept at a constant magnitude and in a constant direction during the swinging, whereby the display screen 1 is always kept stopped at any time during swinging.

The present disclosure involves a simple structure. In the process of swinging of the display screen, the spring torque generated by the constant force spring and the screen torque are always kept equal in magnitude and opposite in direction, and changes of the spring torque and the screen torque without error are indeed achieved during the entire process, so that a larger screen can be swung more flexibly and effortlessly, the display screen can be rotated by being pushed slightly, and the display screen can be stopped at any time during the swinging, whereby the user experience is greatly improved.

In the technical solution described above, optionally, a center $O_3$ of swinging of the swinging end 32 on the screen connecting base 20, the overall gravity center $O_2$, and the screen rotation center $O_1$ of the screen connecting base 32 are located on the same straight line.

This embodiment further comprises a moving member 12 movably arranged on the stand 10 and a track 11 arranged on the stand 10, wherein the moving end 31 of the constant force spring 30 is connected with the moving member 12, and the moving member 12 is movably arranged on the track 11. That is to say, the moving end 31 is slidably connected with the stand 10 via the moving member 12.

In the technical solution described above, the sliding of the moving end may be implemented by means of a sliding rail. The sliding rail comprises a movable rail as the moving member 12, a fixed rail as the track 11, and roll balls; the moving end 31 of the constant force spring 30 is connected with the movable rail, and the fixed rail is fixedly arranged on the stand 10; and roll balls are arranged between the movable rail and the fixed rail.

Optionally, in the technical solution described above, as shown in FIG. 2, the moving member 12 may be movably arranged on the track 11 via rolling members such as rolling bearings 12a. The moving member 12 is arranged on the track 11 via the rolling bearings, whereby the frictional resistance applied to the moving member 12 can be effectively reduced, so that the moving end 31 of the constant force spring 30 can slide quickly with the swinging of the screen connecting base 20, and a balance between the spring torque and the screen torque can be quickly achieved (that is, a sum of the two torques is zero).

Figure 2:
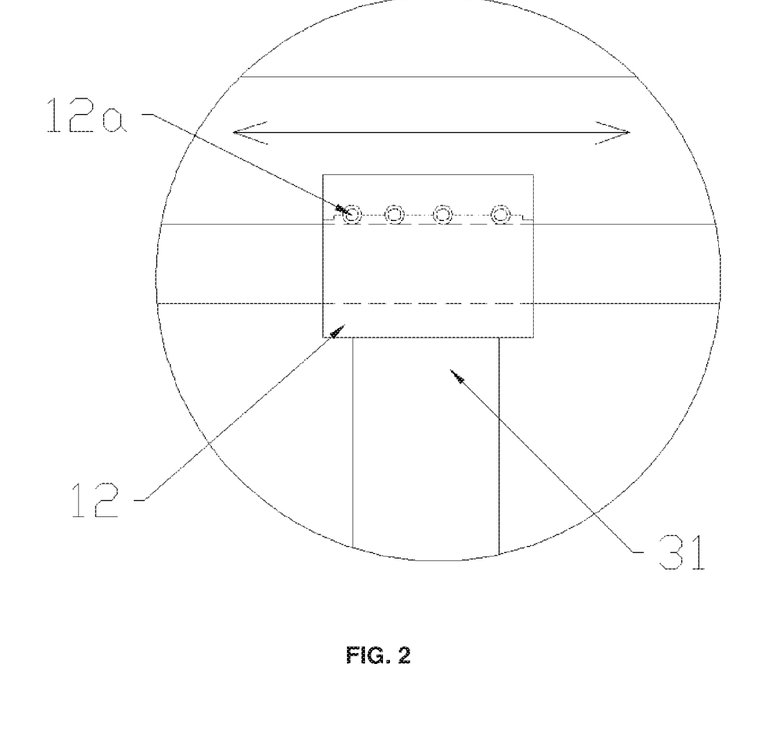
FIG. 2 is a partially enlarged view of portion A of the display screen support holder shown in FIG. 1.

Optionally, the moving member 12 is a slider slidably arranged on the track 11. When the moving member 12 is in the form of a slider, there is a friction damping force, thus the display screen 1 can be more stabilized after being positioned and is less likely to be swung freely due to interference from an external force due to a cooperation between the spring force and the friction damping force, thereby avoiding hindering a viewer from watching the display screen. Similarly, when the moving member 12 is arranged on the track 11 using roll balls and rolling bearings, the surface of the track 11 may be provided in a zigzag form, or a number of grooves may be provided at intervals on the track 11 and configured to temporarily lock the moving member 12, thereby achieving the stability of the display screen 1.

Here, optionally, the track 11 is in a linear shape and is horizontally arranged.

This embodiment further comprises a swinging member 21 rotatably pivotally connected with the screen connecting base 20, and the swinging end 32 of the constant force spring 30 is connected with the swinging member 21 and thus is rotatably connected with the screen connecting base 20 via the swinging member 21. The swinging end 32 of the constant force spring 30 is arranged on a side of the screen rotation center $O_1$ closer to the overall gravity center $O_2$, and the moving end 31 is arranged above the swinging end 32.

Figure 3:
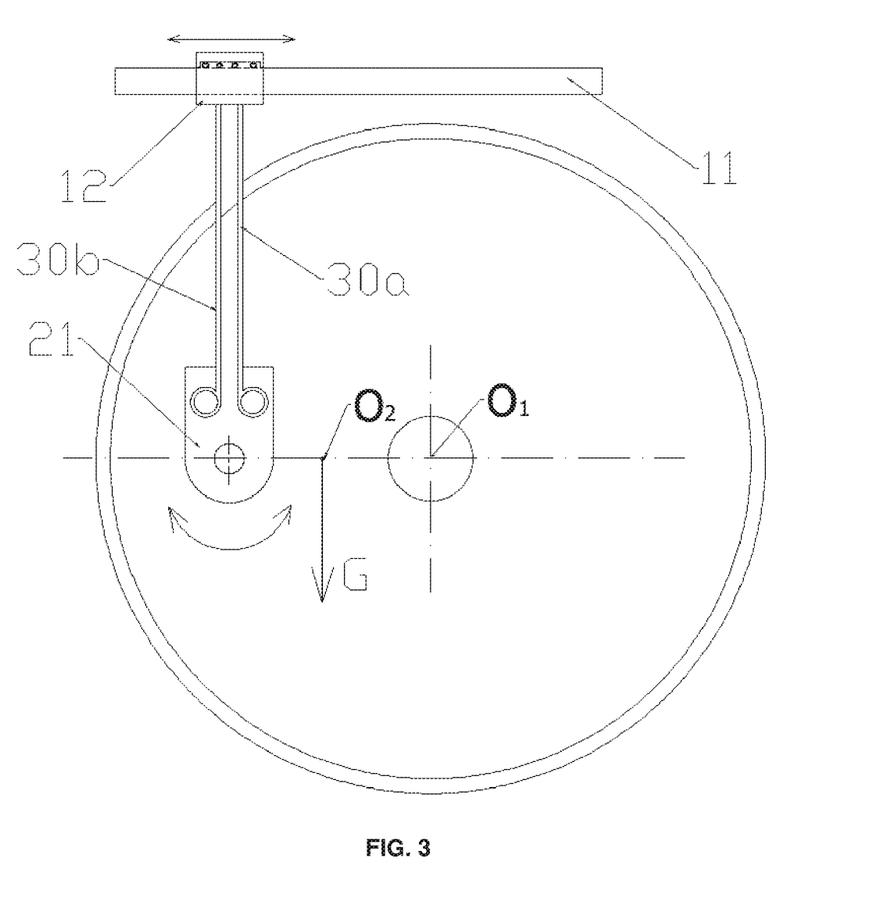
FIG. 3 is a structural schematic diagram of two constant force springs arranged back to back in the first embodiment of the present disclosure.

As shown in FIG. 3, two constant force springs 30 are provided, including a left constant force spring 30a and a right constant force spring 30b, and the two springs are arranged symmetrically. That is to say, an end of the left constant force spring 30a and a respective end of the right constant force spring 30b are arranged on the same moving member 12 in a back-to-back or face-to-face manner, and the other end of the left constant force spring and the other end of the right constant force spring are arranged on the same swinging member 21 in a back-to-back or face-to-face manner.

In this embodiment, the moving end 31 is a connector (plate) end of the constant force spring 30, and the swinging end 32 is a winding portion. In practical applications, the two ends may be interchanged with each other.

In addition, the screen connecting base 20 is a circular disc body, and the stand 10 is provided with an outer ring mounting structure (e.g., an annular groove, an annular mounting table, or the like) adapted to an outer diameter of the circular disc body; wherein, optionally, a rolling member (e.g., a roll ball, a bearing, a roller, or the like) is arranged between the circular disc body and the outer ring mounting structure, and the screen connecting base 20 is rotatably arranged on the outer ring mounting structure via the rolling member.

Moreover, a limiting structure (e.g., a limiting boss and a positioning pin and a positioning hole engaged with each other) configured to restrict an angle of rotation of the screen connecting base 20 is arranged between the screen connecting base 20 and the stand 10.

The display screen support holder according to the present disclosure has a simple structure, so that a larger screen can be swung more flexibly and effortlessly, the display screen can be rotated by being pushed slightly, and the screen can be stopped at any time during swinging, whereby the user experience is greatly improved.

In addition, the screen connecting base 20 in the present disclosure is allowed to swing by 90° in both directions, whereas the screen connecting base in the prior art can swing by 90° only in one direction and cannot swing by about 90° in the opposite direction, i.e., in both directions, due to structural limitations. Moreover, the display screen support holder has a simple structure and is suitable for mass production and widespread application.

Second Embodiment

Figure 4:
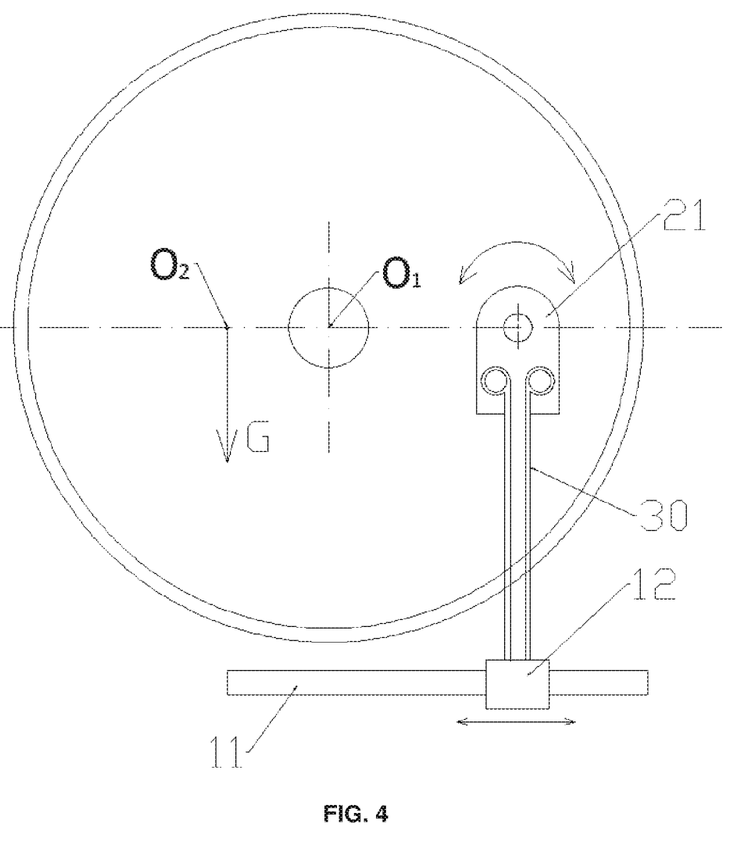
FIG. 4 is a structural schematic diagram of a display screen support holder according to a second embodiment of the present disclosure.

The structure of this embodiment is substantially the same as that of the first embodiment, except that:

as shown in FIG. 4, the swinging end 32 of the constant force spring 30 is arranged on a side of the screen rotation center $O_1$ opposed to the overall gravity center $O_2$, and the moving end 31 is arranged below the swinging end 32 via the track 11.

Third Embodiment

Figure 5:
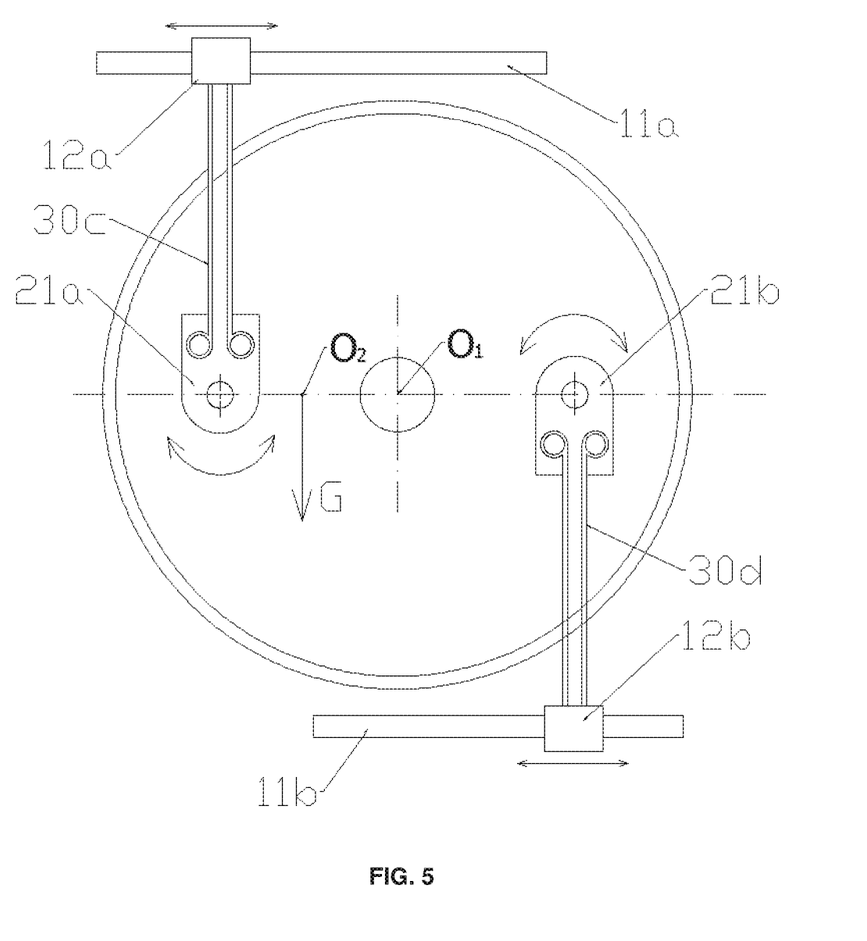
FIG. 5 is a structural schematic diagram of a display screen support holder according to a third embodiment of the present disclosure.

The structure of this embodiment is substantially the same as that of the first embodiment, except that:

as shown in FIG. 5, the track comprises a first track 11a and a second track 11b, wherein the first track 11a is arranged on the stand 10 and above the screen rotation center $O_1$, and the second track 11b is arranged on the stand 10 and below the screen rotation center $O_1$;

the moving member comprises a first moving member 12a arranged on the first track 11a, and a second moving member 12b arranged on the second track 11b;

the swinging member comprises a first swinging member 21a arranged on the left side of the screen rotation center $O_1$ of the screen connecting base 20, and a second swinging member 21b arranged on the right side of the screen rotation center of the screen connecting base; and the constant force spring comprises a first spring 30c arranged between the first moving member 12a and the first swinging member 21a, and a second spring 30d arranged between the second moving member 12b and the second swinging member 21b.

That is to say, this technical solution involves two sets of moving members, swinging members, and tracks. Optionally, the two sets of moving members, swinging members, and tracks are centrosymmetrically arranged with the screen rotation center $O_1$ being a reference center, and the spring torque from the first spring and the spring torque from the second spring are set bilaterally symmetrically to each other, thus the structure is more stable.

Finally, it should be noted that the above embodiments are merely intended to illustrate the technical solutions of the present disclosure, but not intended to limit the present disclosure. Although the present disclosure has been described in detail with reference to the foregoing embodiments, it should be understood by those of ordinary skill in the art that the technical solutions disclosed in the foregoing embodiments may still be modified, or some or all of the technical features thereof may be replaced with equivalents; and these modifications or replacements will not cause the essence of the corresponding technical solutions to depart from the scope of the technical solutions of the embodiments of the present disclosure.

What is claimed is:

1. A display screen support holder, comprising:
a stand;

a screen connecting base; and
a constant force spring,
wherein:
the screen connecting base is pivotally connected with the stand such that the screen connecting base is rotatable about a screen rotation center and configured to be connected with a display;
after a display screen is mounted to the screen connecting base, an overall gravity center of a combined gravity of the display screen and the screen connecting base is set to be deviated from the screen rotation center, in a projection plane perpendicular to a rotation axis of the screen connecting base;
two ends of the constant force spring comprise a moving end and a swinging end, wherein the moving end is movably arranged on the stand, and the swinging end is pivotally connected with the screen connecting base such that the swinging end is swingable about a center of swinging;
during swinging of the screen connecting base, a screen torque, which the combined gravity generates with respect to the screen rotation center, changes constantly with the swinging of the screen connecting base; the moving end of the constant force spring is moved along with the swinging of the screen connecting base, the constant force spring is stretched or contracted with the movement of the moving end, and a spring torque which a spring force of the constant force spring generates with respect to the screen rotation center also changes along with the stretching and the contracting, and the constant force spring is configured to dynamically balance the screen torque;
the display screen support holder further comprises a moving member movably arranged on the stand and a track arranged on the stand, wherein the moving end of the constant force spring is connected with the moving member, and the moving member is movably arranged on the track; and
the display screen support holder further comprises a sliding rail, wherein the sliding rail comprises roll balls, a movable rail which serves as the moving member and a fixed rail which serves as the track; the moving end of the constant force spring is connected with the movable rail, and the fixed rail is fixedly arranged on the stand; the roll balls are arranged between the movable rail and the fixed rail, and the movable rail is rollably and movably arranged on the fixed rail via the roll balls.

2. The display screen support holder according to claim 1, wherein the center of swinging of the swinging end on the screen connecting base, the overall gravity center, and the screen rotation center are located on a same straight line.

3. The display screen support holder according to claim 1, wherein:
the moving member is rollably and movably arranged on the track via a rolling bearing; or
the moving member is a slider slidably arranged on the track.

4. The display screen support holder according to claim 1, wherein the track is in a linear form and is horizontally arranged.

5. The display screen support holder according to claim 1, further comprising a swinging member pivotally connected with the screen connecting base such that swinging member is rotatable about the center of swinging, wherein the swinging end of the constant force spring is connected with the swinging member and is rotatably connected with the screen connecting base via the swinging member.

6. The display screen support holder according to claim 5, wherein: the swinging end of the constant force spring is arranged on a side, closer to the overall gravity center, of the screen rotation center, and the moving end is arranged above the swinging end; or the swinging end of the constant force spring is arranged on a side, away from the overall gravity center, of the screen rotation center, and the moving end is arranged below the swinging end.

7. The display screen support holder according to claim 1, wherein an even number of constant force springs are provided and the constant force springs are arranged in pairs, and the two constant force springs in each pair are arranged symmetrically.

8. The display screen support holder according to claim 1, wherein a damper is arranged between the screen connecting base and the stand, and the damper tends to prevent the screen connecting base from swinging relative to the stand.

9. The display screen support holder according to claim 1, wherein the track is in a linear form and is horizontally arranged.

10. The display screen support holder according to claim 3, wherein the track is in a linear form and is horizontally arranged.

11. The display screen support holder according to claim 1, further comprising a swinging member pivotally connected with the screen connecting base such that swinging member is rotatable about the center of swinging, wherein the swinging end of the constant force spring is connected with the swinging member and is rotatably connected with the screen connecting base via the swinging member.

12. The display screen support holder according to claim 3, further comprising a swinging member pivotally connected with the screen connecting base such that swinging member is rotatable about the center of swinging, wherein the swinging end of the constant force spring is connected with the swinging member and is rotatably connected with the screen connecting base via the swinging member.

13. The display screen support holder according to claim 4, further comprising a swinging member pivotally connected with the screen connecting base such that swinging member is rotatable about the center of swinging, wherein the swinging end of the constant force spring is connected with the swinging member and is rotatably connected with the screen connecting base via the swinging member.

* * * * *